(12) United States Patent
Chu

(10) Patent No.: US 10,774,597 B2
(45) Date of Patent: Sep. 15, 2020

(54) DOWNHOLE TOOL USING A UNIFIED ELECTRONIC INTERFACE

(71) Applicant: Halliburton Energy Services, Inc., Houston, TX (US)

(72) Inventor: Jianying Chu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/538,227

(22) Filed: Aug. 12, 2019

(65) Prior Publication Data
US 2019/0360278 A1 Nov. 28, 2019

Related U.S. Application Data

(63) Continuation of application No. 15/963,370, filed on Apr. 26, 2018, now abandoned.

(51) Int. Cl.
| | | |
|---|---|---|
| *E21B 47/12* | (2012.01) | |
| *E21B 17/02* | (2006.01) | |
| *G05B 17/02* | (2006.01) | |
| *H02H 1/00* | (2006.01) | |

(52) U.S. Cl.
CPC ........... *E21B 17/028* (2013.01); *E21B 47/12* (2013.01); *G05B 17/02* (2013.01); *H02H 1/0007* (2013.01); *H02H 1/0092* (2013.01)

(58) Field of Classification Search
CPC ....... E21B 17/028; E21B 47/12; G05B 17/02; G05B 2219/45129; H02H 1/0007; H02H 1/0092
See application file for complete search history.

(56) References Cited

U.S. PATENT DOCUMENTS

2014/0310433 A1* 10/2014 Preusser ........... H04W 52/0261
710/12

* cited by examiner

*Primary Examiner* — Benyam Haile
(74) *Attorney, Agent, or Firm* — Gilliam IP PLLC

(57) ABSTRACT

An interface module has an outward interface with at least two ports for directly connecting to separate sections of a tool bus. The outward interface may have two uplink ports and one downlink port for layered tool bus applications. Each port has two electrical contacts for creating an electrical path between electronic assemblies with combined power & data transmission (CPDT) using a transmission line. A power port is connectable to an external power source via a common electrical path. A standardized inward interface of the interface module provides data and communication contact groups for data and power communication with assembly electronics. The interface module is implemented using advanced electronics packaging technology for easy installation on a printed circuit board. The interface module facilitates a streamlined downhole electronic testing configuration for testing electronics as they are developed prior to completion of development of dependent components.

13 Claims, 9 Drawing Sheets

DOWNHOLE TOOL USING A UNIFIED ELECTRONIC INTERFACE

CROSS-REFERENCE TO RELATED APPLICATIONS

The present application is a continuation of U.S. patent application Ser. No. 15/963,370, filed on Apr. 26, 2018, the disclosure of which is hereby incorporated herein by reference in its entirety

FIELD OF THE INVENTION

The present disclosure relates to a unified electronic interface module for downhole applications which connects electronic assemblies, especially printed circuit board assemblies (PCBAs) of a downhole tool, directly to a layered tool bus. The present disclosure also relates to a streamlined downhole electronic testing configuration which facilitates testing of downhole electronics as they are developed prior to completion of development of dependent components.

BACKGROUND

Electronics are increasingly desired for testing, control, measurement, actuation, and communication in downhole (i.e., in a wellbore) applications, such as measurement while drilling/logging while drilling (MWD/LWD) and directional drilling (or geosteering), wireline logging, coil tubing, slickline services, and the like. Downhole environments are harsh. Accordingly, electronics in a downhole environment may require being properly protected against high pressures, conductive fluids, corrosive chemicals, severe vibrations, and mechanical shocks that are in excess of their designed specifications.

A downhole tool is a self-enclosed unit which can perform specific functions, such as formation measurements, coring, fluid sampling, toolstring monitoring and so forth in a downhole environment. Downhole electronics comprise thousands of parts and components which are typically installed on various print circuit boards (PCBs). A tool typically comprises multiple electronics assemblies, such as printed circuit board assemblies (PCBAs) in order to achieve complex functionality. Given the harsh downhole operating environments, the electronic assemblies are typically installed in protective cavities to ensure reliable operation. For example, a tool may be constructed from high-strength metal or metal alloys and have a tubular or cylindrical body for easy deployment. The protective cavities within which the electronic assemblies are installed are dispersedly cut out from the metal to avoid creation of weak points in the tool body. Further, wireways, i.e., special long thin cavities are also created so that cables and harnesses can be used to interconnect the electronic assemblies for the data and power communication.

In some implementations, a bottom-hole assembly (BHA) includes a plurality of these protective packages (i.e., segments) connected end-to-end at segment joints. The BHA may include one or more tools in each of the segments. The tools are usually connected to a tool bus through which power and data can be communicated so that the tools operate collaboratively to complete complex downhole jobs. In most cases, the tool bus is further coupled to the surface via a telemetry tool for real-time communication, control, and power transmission. In practice, a segment is typically a drill collar, a drill sub, a pressure mandrel, and so forth.

Internally, the PCBAs of a tool are interconnected together via one or multiple harnesses. For easy service later on, harnesses are usually detachable. In practice, a PCBA is typically equipped with connectors at its one or both ends, and correspondingly a harness of stranded wires with mating connectors are interconnected by the stranded wires. When a tool is assembled, the mating connectors of a harness are securely joined to the corresponding connectors on the PCBAs with jackscrews. Therefore, different PCBAs of a tool can transmit data and power, or achieve specific purpose such as synchronization or control, etc, using the electrical connections provided by the wire harnesses.

Typically, micro D connectors conforming to the MIL-DTL-83513 standard such as ITT Cannon MDM series, AirBorn M series and the like are most widely used in downhole applications. A standard micro D connector has a selectable number of contacts from 9 up to 100 or more and also has different varieties in terms of configurations, temperature rating, materials and finishes. Although standard micro D connectors are readily available, mating harnesses are usually customized because the wire length, number of interconnections and mating connectors of the harnesses are dependent on the specific tool design. For example, different numbers of connections may be needed between different PCBAs of a tool. Typically, the mating harnesses have several tens to a hundred or more connections between the PCBAs of a tool. Despite the small profile of each stranded wire, based on the large numbers of connections, a wire harness may be large, taking up valuable space within a segment.

Historically, electronics development of a downhole tool is costly, lengthy and challenging. Given that downhole environments are usually much harsher than most electronics are designed for, tremendous efforts must be made to screen out the "tough" electronics with extra quality beyond what electronics suppliers can ensure. Typically, a multi-stage progressive development method is taken by the industry, of which each stage has a different test emphasis to simplify the instrumentation needs. Generally, downhole electronics are progressively tested at the component level, module level, assembly (e.g., PCBA) level, tool level, and toolstring level and culminate in a field trial. As the result, tool development is lengthy and expensive. Statistically, it takes about 3-5 years to develop a MWD/LWD tool, and 1-3 years for a wireline tool. A total capital expense of tens of million dollars is very common for a MWD/LWD tool, although it is a bit less for a wireline tool at the order of serval million dollars.

Today, oil/gas markets are more volatile than ever and the traditional development process hardly meets rapidly-changing industry needs.

SUMMARY

Various aspects of the disclosure provide an interface module that comprises an outward interface for communication of power and data over a tool bus. The outward interface comprises a first tool bus port for connecting to a first section of the tool bus and a second tool bus port for connecting a second section of the tool bus. The first and second bus ports are uplink ports, wherein the first and second sections of the tool bus are at a first layer of the tool bus. The interface module also comprises a first data transceiver in communication with the first and second bus ports and configured to receive a data signal from or transmit a data signal to the tool bus through the first and second bus ports. The interface module also comprises a first power transceiver in communication with the first and second ports and configured to receive power from or transmit power to the tool bus through the first and second bus ports, and to generate different power rails. The interface module also comprises a main controller configured to control the first power transceiver and the first data transceiver, and to communicate with the tool bus via the outward interface.

In some aspects of the disclosure, the interface module also comprises an inward interface comprising a group of power contacts and a group of data contacts, wherein the group of power contacts provides the different power rails.

In some aspects of the disclosure, the main controller is further configured to process data communications and perform communication transformations between the first data transceiver and the group of data contacts.

In some aspects of the disclosure, the interface module further comprises a downlink bus port for connecting to a third section of the tool bus, wherein the third section of the tool bus is at a second layer of the tool bus. The interface module also comprises a second data transceiver in communication with the downlink bus port and configured to receive a data signal from or transmit a data signal to the second layer of the tool bus through the downlink bus port. The interface module also comprises a second power transceiver connected to the downlink bus port and the first power transceiver and configured to receive power from or transmit power to the second layer of the tool bus through the downlink bus port.

In some aspects of the disclosure, the main controller is further configured to process data communications and perform communication transformations between the first data transceiver and the second data transceiver.

In any of the above aspects of the disclosure, each of the first and second bus ports, and/or the downlink bus port comprises a pair of contacts for connection to a transmission line and communication of power and data over the tool bus.

In any of the above aspects of the disclosure, the interface module further comprises a power port coupled to the first power transceiver and configured to receive power from an external power source.

Various aspects of the disclosure provide a downhole tool that comprises a first electronics assembly for performing a first function of the tool, wherein the first electronics assembly comprises a first unified interface module with an outward interface for communication of power and data over a tool bus. The downhole tool also comprises a second electronics assembly for performing a second function of the tool, wherein the second electronics assembly comprises a second unified interface module with the outward interface. The outward interface comprises a first tool bus port and a second tool bus port for connecting to different sections of the same layer of the tool bus.

In some aspects of the disclosure, the downhole tool further comprises a first transmission line connected between the first tool bus port of the first unified interface module and the second tool bus port of the second unified interface module to provide a first section of the tool bus.

In any of the above aspects of the disclosure, the downhole tool further comprises a third electronics assembly for performing a third function of the tool, wherein the third electronics assembly comprises a third unified interface module with the outward interface. The downhole tool further comprises a second transmission line connected between the first tool bus port of the second unified interface module and the second tool bus port of the third unified interface module to provide a second section of the tool bus.

In any of the above aspects of the disclosure, the first section and the second section of the tool bus are at a first layer of the tool bus.

In any of the above aspects of the disclosure, the outward interface further comprises a third tool bus port for connecting to a different section of the tool bus at a different layer than the first and second tool bus ports.

In any of the above aspects of the disclosure, the downhole tool further comprises a fourth electronics assembly for performing a fourth function of the tool, wherein the fourth electronics assembly comprises a fourth unified interface module with the outward interface. The downhole tool further comprises a third transmission line connected between the third tool bus port of the fourth unified interface module and the second tool bus port of the first unified interface module to provide a third section of the tool bus.

In some aspects of the disclosure, the third section of the tool bus is at a second layer of the tool bus.

Various aspects of the disclosure provide a method of testing an electronics assembly of a new downhole tool prior to completion of development of dependent electronic assemblies of the tool. The method comprises providing a simulator toolstring comprising an existing downhole tool and a tool bus, the existing downhole tool comprising a first electronics assembly with a first unified interface module with an outward interface, the outward interface comprising a first tool bus port and a second tool bus port for connecting to different sections of the tool bus for data and power transmission. The method also comprises providing the electronics assembly of the new downhole tool, the electronics assembly comprising a second unified interface module with the outward interface. The method also comprises directly connecting the electronics assembly of the new downhole tool to the tool bus via a transmission line between the first tool bus port of the second unified interface module and the second tool bus port of the first unified interface module. The method also comprises testing the electronics assembly of the new downhole tool at each of an assembly, tool, and toolstring level.

In some aspects of the disclosure, the method also comprises connecting the electronics assembly of the new downhole tool to a debugger through an inward interface of the second unified interface module, wherein the inward interface comprises a power group of contacts and a data group of contacts.

In some aspects of the disclosure, the electronics assembly of the new downhole tool to the debugger via a wire harness with connections to the inward interface of the second unified interface module.

Various aspects of the disclosure provide a test configuration for testing an electronics assembly of a new downhole tool prior to completion of development of dependent electronic assemblies of the tool. The test configuration comprises a first unified interface module comprising with an outward interface and an inward interface, the outward interface comprising a first tool bus port and a second tool bus port for connecting to different sections of a tool bus for data and power transmission, the inward interface comprising a power group of contacts and a data group of contacts connected to the electronics assembly of the new downhole tool. The test configuration also comprises a simulator interface module with the outward interface and the inward interface. The test configuration also comprises a transmission line connected between the first tool bus port of the first unified interface module and the second tool bus port of the simulator interface module to provide a first section of the tool bus. The test configuration also comprises a debugger coupled to the inward interface of the simulator interface module and configured to stimulate the inward interface of the simulator interface module to simulate dependencies between the electronics assembly of the new downhole tool and a dependent electronic assembly of the tool.

In some aspects of the disclosure, the test configuration also comprises a simulator toolstring that includes an existing downhole tool and the tool bus, the existing downhole tool comprising a second electronics assembly with a second unified interface module with the outward interface. The test configuration also comprises a second transmission line connected between the second tool bus port of the first unified interface module and the first tool bus port of the second unified interface module to provide a second section of the tool bus.

In any of the above aspects of the disclosure, the test configuration also comprises a test computer coupled to the debugger and configured to execute an application to perform one or more of debugging, testing, diagnosing, or logging on the electronics assembly of the new downhole tool.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed tools and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that anyone or any combination of a list of options can be used. For example, "A, B, and/or C" means "A", or "B", or "C", or "A and B", or "A and C", or "A and B and C".

For ease in illustrating of the principles and methods of the present invention, a drillstring BHA is used for illustrations. However, it should be understood that it doesn't imply any limitations or constraints on the invention from being used in other types of downhole BHAs, like wireline, slickline, coiled tubing, etc.

Drillsting Bottom Hole Assembly (BHA)

Figure 1:
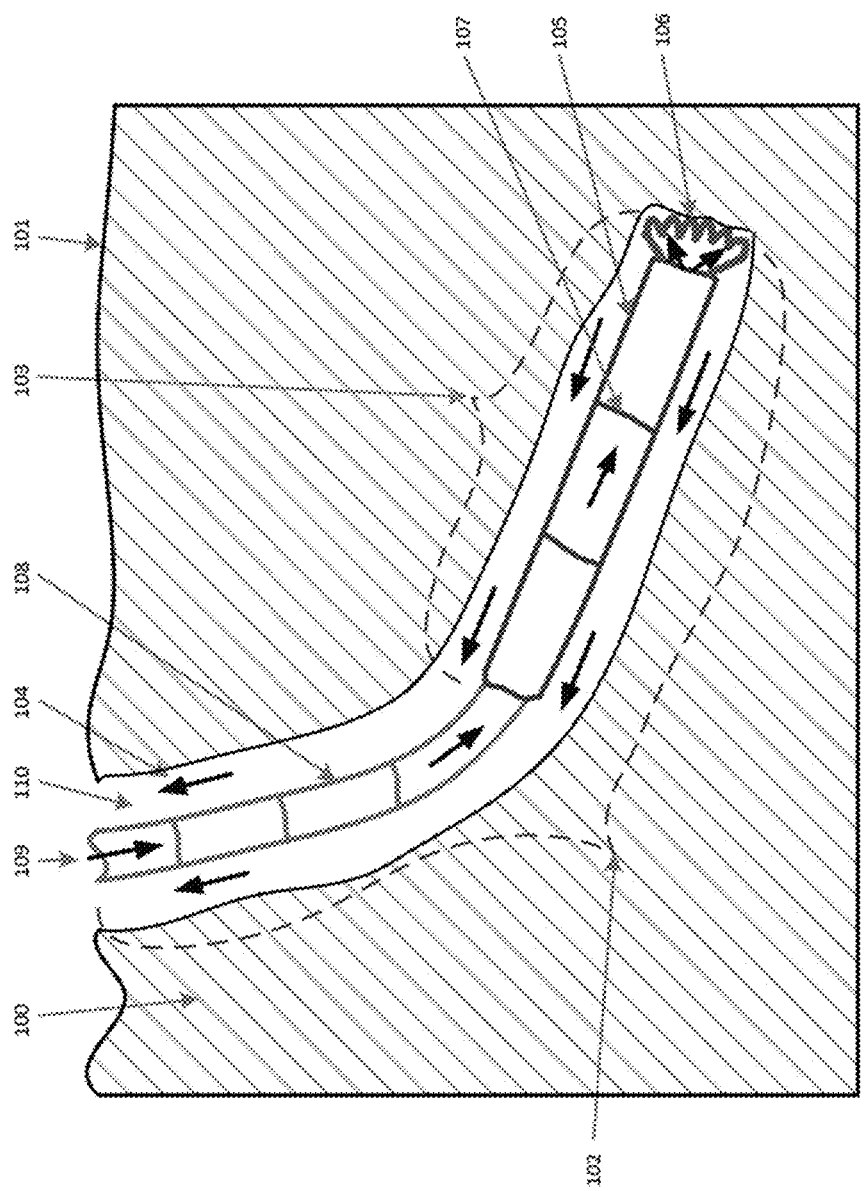
FIG. 1 is a schematic diagram of a partial drillstring with a bottom hole assembly (BHA) in a wellbore suitable for implementing the several embodiments of the disclosure.

FIG. 1 is a schematic diagram of a partial drillstring 102 with a BHA in a wellbore suitable for implementing the several embodiments of the disclosure. The drillstring 102 is used to penetrate a formation 100 and create a borehole connecting a targeted reservoir to the surface 101. The drillstring 102 is made up of an assembly of serially-connected drill pipes 108 at its upper section and a BHA 103 at its lower section. The BHA 103 includes serval segments 105 of drill collars or functional drill subs connected end-to-end with rotatory shouldered joints 107, and a drill bit 106 disposed at its lower distal end. Various tools (not shown) like a density tool, porosity tool, MRIL tool, telemetry tool, and geosteering tool may be enclosed in the BHA segments 105. A tool bus (not shown) is used to network the tools for data and power transmission. Usually, a telemetry tool is used to further link the tool bus to the surface for real-time data communication and power transmission. The drillstring 102 has an inner bore 109 to circulate drill mud 104 from the surface 101 down to the nozzles (not shown) of the drill bit 106, then circulate up through the annulus 110 between the drillstring and the borehole, and finally back to a mud pit (not shown) on the surface 101.

A Tool Desgin of Prior Arts

Each downhole tool uses specific electronics and circuit design to achieve required functions. Dependent on the complexity of a tool, one or multiple PCBAs may be used. A tool may also comprise other electronic or electromechanical units like a transducer, antenna, motor, etc. Given the large varieties of downhole tools, a typical tool design is used to illustrate the principles and methods of the present disclosure. However, it should be understood that the principles and methods of the present disclosure may be used in other applicable tool designs.

Figure 2:
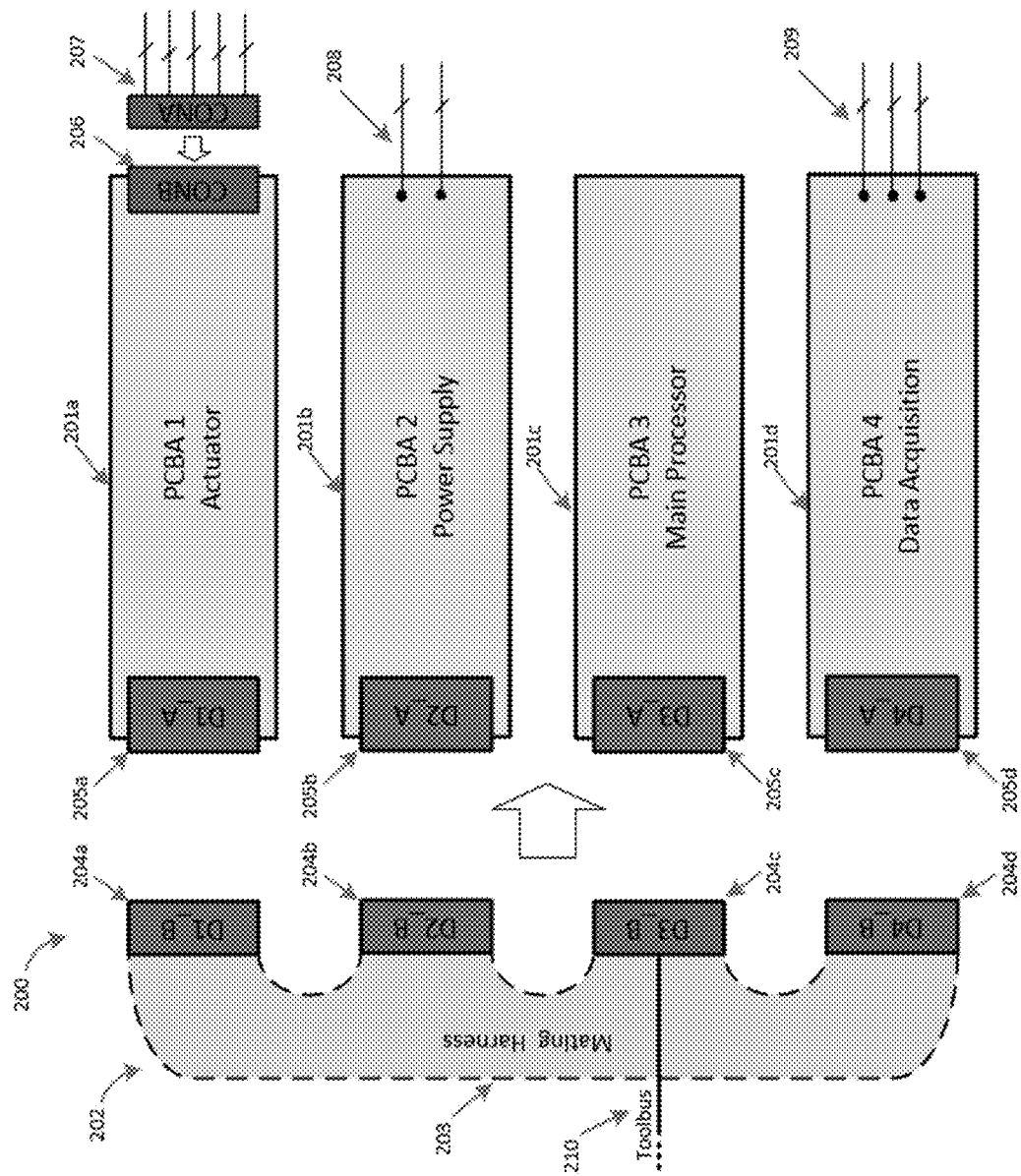
FIG. 2 is a schematic diagram of a conventional tool design with micro D connectors and mating harnesses as the interconnections in accordance with current industry practice.

FIG. 2 is a schematic diagram of a conventional tool design with micro D connectors and mating harnesses as the interconnections in accordance to current industry practice. The tool 200 comprises 4 PCBAs 201. Other functional units like detectors, small front-end circuits are not shown for ease in illustration. Each PCBA usually performs a specific function. For example, PCBA 201a may be used to actuate or excite some functional units such as an antenna, coil, solenoid, motor, etc. PCBA 201b may be used to generate the power required for the actuation. PCBA3 201c may function as the main controller which integrally controls other PCBAs to achieve the tool functionality. PCBA4 201d may function as data acquisition and processing of signals received from detectors, transducers, sensors, etc.

The harness 202 is used to interconnect the four PCBAs 201 together so that power and data signals can be communicated among the PCBAs 201. The harness 202 comprise stranded wires 203 and mating connectors 204. To improve communications throughput, multiple parallel connections between the PCBAs 201 may be formed with the stranded wires 203. Each PCBA 201 has its own connector 205, typically a micro D connector, which can be mated to the harness connector 204 during installation. When the tool is assembled, the mating harnesses are inserted into the on-board mating connectors and then tightly secured with jackscrews quickly to create detachable connections.

Detachable connections are expected when the number of connections is high. Otherwise, "Fixed" connections, i.e., connector-less methods are preferred when the number of connections is low. "Fixed" connections such as direct wire-soldering, mechanically-securing or electrically-gluing may be preferred to achieve lower material cost and better reliability. The disadvantage of "Fixed" connections is the increased difficulty for service or repair.

In order to communicate with other tools on the tool bus, the harness 202 usually includes a connection 210 to tool bus. However, current technology only supports a limited number (5~8) of nodes on the tool bus and also has a limited bus throughput due to low bus speed. Therefore, only one of the PCBAs 201 in the tool 200 is connected to the tool bus. In most cases, the tool bus connection 210 is routed to the main processor PCBA 201c.

Connectors may also be used at the other end of PCBAs 201. In the FIG. 2, PCBA 201a uses an on-board connector 206, which may be a micro D connector or other type of connector. As shown, PCBA 201b and PCB 201d have two fixed connections 208 and three fixed connections 209, respectively, to other devices or components of the tool 200. For example, the fixed connections 208 may be from a turbine that generates power for the tool 200.

The harness 202 can hardly be standardized. The interconnections required by each PCBAs vary from one to other. For example, the interconnections between PCBA 201a and PCBA 201b may be different than the interconnections between PCBA 201c and PCBA 201b. The wire length and structure of the harness 202 are also design-specific and depend on the physical location of each PCBA and the wireway design within each segment 105. In practice, PCBAs are placed in protective cavities created by cutting out solid tool body segments 105. Because cutting away material from the segments 105 reduces the tool mechanical strength, the cavities are usually dispersed along the length of the segment 105 in order to avoid creating weak points in the segment 105. Meanwhile, wireways or special long thin cavities are created in the segments 105 to link the PCBA cavities together. The stranded wire harness can be secured in the wireways to prevent damage during installation and downhole operation. As a result, harnesses usually have to be customized on the basis of each tool design. Customization of harness is unfavourable as it not only increases the cost, but also results in long lead time supply chains which further drive up costs. Additionally, customized wire harnesses prevent design flexibility, as design changes or updates may necessitate another round of development and customization.

Despite of widespread use of micro D connectors and mating harnesses, the interconnection method is unsatisfactory to the industry due to its limitations and resultant challenges on tool design. Despite of the strict MIL-DTL-83513 standard, micro D connectors are inherently fragile and vulnerable to pin damage, wire pinch, loose contacts, etc. A micro D connector uses tiny contact pins of 40 mils in diameter which have low mechanical strength, and the stranded wires used in traditional wire harnesses are also very thin at a gauge of #24 to #32 AWG. The large number of connections typically used in downhole electronics systems further limit tool reliability as any single contact problem may result in a system failure.

Micro D connectors and harness are also bulky. For example, a 31-pin MDM connector is about 2"×0.7" in size. For a typical PCB of 2.2"×12", nearly 10% of PCB is wasted if both ends use micro D connectors. Accordingly, micro D connectors result in large cavities and wireways in the segments 105. Micro D connectors and harness are also expensive and subject to customization, as discussed above. Additionally, interconnection methods using micro D connectors and harnesses have low performance, including low signal speed on the order of a few tens of kilobytes per second and noisy electromagnetic operating environments.

Unified Interface Module

Generally, it is favorable for a downhole tool to have a low number of connections because this leads to small wireways and high tool strength. A combined power and data transmission (CPDT) requires only one electrical path so that the simplest connections between PCBAs of a tool can be achieved. Some downhole applications necessitate a CPDT. For example, a drillstring BHA typically uses a single electrical contact across tool joints for reliable operation, and thus only supports a CPDT.

A high-seep and high-performance tool bus with a layered architecture that supports over one hundred nodes is disclosed by the same applicant in U.S. patent application Ser. No. 15/861,380, entitled "Bottom Hole Assembly Tool Bus System" filed on Jan. 3, 2018, hereby incorporated by reference in its entirety. With the availability of large numbers of nodes on the tool bus, each PCBA of a tool can directly connect to the tool bus through a CPDT interface. A CPDT interface requires only one electrical path with a minimum of two connections, one for a bus signal and the other for the bus return. Because there are a low number of connections, either detachable or "Fixed" connections methods may be used.

In various implementations of the disclosure, a transmission line may be used for the CPDT interface. A transmission line comprises at least two conductors that have a constant characteristic impedance all the way along the communication channel at the frequency range of interest. A conductor(s) of the transmission line is used to pass the signal and power, while the other conductor(s) are used for the bus return current. Therefore, a circuit loop is created by the transmission line, i.e., a single electrical path between two connections for transmitting signal and return currents. Multi-conductor transmission lines with three or more conductors may also be used herein. A two-conductor transmission line may be, for example, a coaxial cable, ladder line, twisted wire pairs, or any other types of two-conductor transmission line. For downhole applications, coaxial cables are preferred.

A node supporting dynamical reconfiguration and intelligent diagnosis of tool bus is disclosed by the same applicant in U.S. patent application Ser. No. 15/893,225, entitled "Reconfigurable Tool Bus Network For A Bottom Hole Assembly," filed on Feb. 9, 2018, hereby incorporated by reference in its entirety. The disclosed node uses two ports which can be separately connected to two bus sections of the same layer of a tool bus to achieve sequential control of each part (node or bus section) of a tool bus. Each port includes a bus switch that is selectively controlled to connect or disconnect the node from a respective bus section. Additionally, the node uses a tool switch that can automatically disconnect faulty tool electronics from the tool bus without severing the tool bus. Additionally, the node uses a terminator switch to automatically connect or disconnect a terminator to the tool bus and thereby ensure that the tool bus is properly terminated.

A unified interface module with standardized connections is disclosed that has an outward interface with a plurality of ports for connecting electronic assemblies (PCBAs) directly to a layered tool bus. The ports on the outward interface provide connection points for transmission lines of the layered tool bus, which increases the number of nodes available on the tool bus as well as increases the communication speed and throughput of the tool bus. The unified interface module has a minimum of connections to provide high reliability, low complexity, low cost, and excellent universality. The unified interface module saves lengthy and expensive customization and leads to shortened development and component reuse for a simplified tool BOMs (bills of material).

The unified interface module also facilitates streamlined testing of downhole electronics as they are developed prior to completion of development of dependent components. Through an outward interface of the unified electronic interface module, a developed PCBA for a tool is directly connected to a testing tool bus. Therefore, a first PCBA of a tool under development may be tested prior to completion of other PCBAs of the tool. The testing of the first PCBA of the tool is able to be performed at each of the assembly (e.g., PCBA) level, tool level, and toolstring level due to the direct connection to the tool bus through the unified interface module.

The unified electronic interface module also facilitates simulation of dependent PCBAs of a tool that are still under development through stimulation of an internal interface by a debugger.

Figure 3:
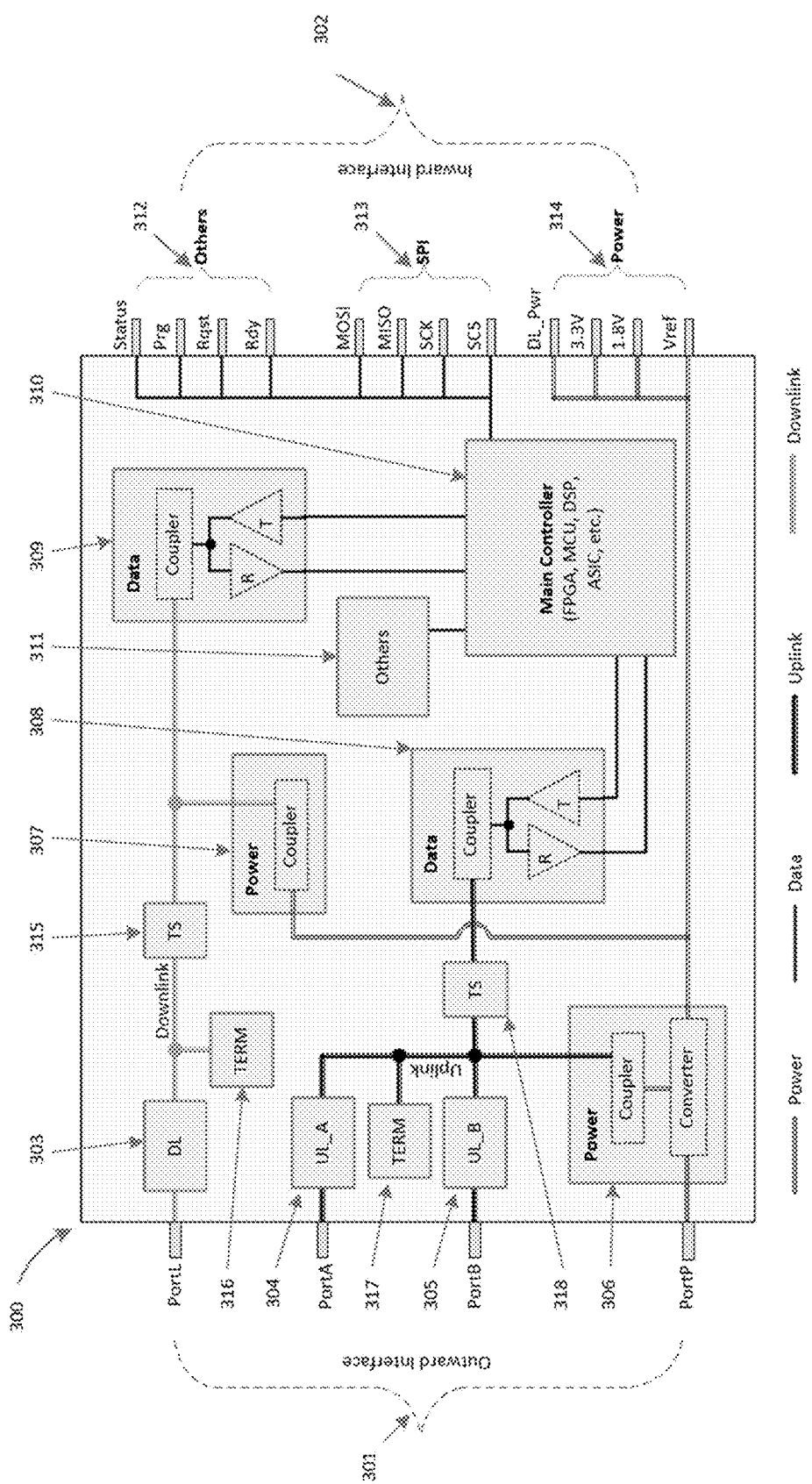
FIG. 3 is a schematic diagram of a unified interface module according to various implementations of the disclosure.

FIG. 3 is a schematic diagram of a unified interface module 300 according to various implementations of the disclosure. The interface module 300 comprises an outward interface 301 and an inward interface 302. When the interface module 300 is integrated into an electronic assembly, typically a PCBA, the outward interface 301 connects the assembly to other assemblies via transmission lines, such as coaxial cables. The inward interface 302 provides a multiple-contact connection to the electronic assembly. The interface module 300 is connected to the electronic assembly using common electronic mounting methods such as soldering, electrically-gluing, or mechanically securing.

The outward interface 301 comprises four ports, PortL, PortA, PortB and PortP. Each of PortA, PortB, and PortL has two contacts to create an electrical path and can be electrically connected to a port of another interface module 300 via a transmission line. A first contact of each port is configured to carry a signal and a second contact of each port is configured to carry a return. PortA is connected to a functional block UL_A 304 and PortB is connected to a functional block UL_B 305 within the interface module 300. Each of PortA and PortB are used to connect the electronic assembly to serial sections of the tool bus at the same layer of the bus, i.e., Uplink. For example, PortA connects the interface module 300 to a first section of the tool bus and PortB connects the interface module 300 to a second section of the tool bus, where the first and second sections of the tool bus are at the same logical layer of the tool bus.

In some implementations, the block UL_A 304 and the block UL_B 305 are electrical bus switches controllable by the main controller 310 as described in the U.S. patent application Ser. No. 15/893,225. For example, the bus switches of blocks UL_A 304 and UL_B 305 are configurable by the main controller 310 in an open/closed position and connected in series with each other and with the tool bus sections to which PortA and PortB are connected.

In some implementations, the bock UL_A 304 and the block UL_B 305 are simply conductive passthroughs, such as a transmission line connection to the other components of the interface module 300.

The Uplink ports of the interface module 300 may additionally include a terminator block TERM 317 and a tool bus switch block TS 318. The terminator block TERM 317 includes a terminator switch and a terminator. The terminator has the same characteristic impedance as the tool bus. Terminators are used at the distal endpoints of communications busses to prevent reflections. The terminator switch is configured to selectively open/close to connect or disconnect the terminator from the tool bus. The state of the terminator switch is linked (via logic circuits) to the states of the bus switches in the bock UL_A 304 and the block UL_B 305. For example, the terminator switch automatically opens when both the bus switches in the bock UL_A 304 and the block UL_B 305 close to prevent repetitive bus terminations on the tool bus (i.e., typically terminators on the two distal ends are connected to the tool bus). Likewise, the terminator switch is closed to connect the terminator to the bus when either bus switch in the bock UL_A 304 and the block UL_B 305 is opened.

The tool switch block TS 318 includes a tool switch controllable by the main controller 310 to selectively open/close to connect or disconnect electronics after the tool switch from the tool bus. For example, the main controller 310 performs a diagnostic test on the electronics to identify any faults (e.g., short circuit, open circuit, etc.). Upon detecting a fault, the main controller 310 controls the tool switch to disconnect the electronics from the tool bus. Accordingly, the main controller 310 can detach faulty electronics from the tool bus through the tool switch block TS 318 while still maintaining continuity of the tool bus through the interface module 300 by way of the bus switches in bocks UL_A 304 and UL_B 305. Similarly, the main controller 310 can receive or generate an instruction to disconnect (i.e., detach) the electronics from the bus. Upon obtaining the instruction to disconnect the electronics from the tool bus, the main controller controls the tool switch to disconnect the electronics from the tool bus.

Each of the bus switches, tool switches, or terminator switches may be a unidirectional switch (e.g., MOSFET switches), a combination of two unidirectional switches in a back-to-back or head-to-head configuration, or a bidirectional switch.

PortL is connected to a functional block DL 303 and is used for connecting the interface module 300 to another layer of the tool bus, i.e., Downlink. Similar to blocks UL_A 304 and UL_B 305, the block UL 303 may be an electrical switch controllable by the main controller 310 or a simple electrical passthrough. For example, PortL connects the interface module 300 to a third section of the tool bus that is at a different logical layer of the tool bus than PortA and PortB. As with PortA and PortB, the Downlink port of the interface module 300 may additionally include a terminator block TERM 316 and a tool bus switch block TS 315. The terminator block TERM 316 and a tool bus switch block TS 315 operate similar to the terminator block TERM 317 and the tool bus switch block TS 318 described above. In some implementations, the operation of the terminator block TERM 316 and a tool bus switch block TS 315 are tied to the operation of the terminator block TERM 317 and the tool bus switch block TS 318. For example, if the main controller 310 instructs the tool bus switch block TS 318 to close, the tool bus switch block TS 315 is likewise instructed to close, and vice versa.

PortP is used to connect the interface module 300 to an electrical power source, typically DC power from an external power source, and route it to a power transceiver block 306. A simple electrical path instead of a transmission line may be used to connect the PortP to external power source. The external power source is typically a downhole turbine or a battery.

The power transceiver block 306 includes a power coupler and a power converter. A coupler (power or data) is configured to pass through an electrical component (power or data) of interest at a minimal insertion loss while blocking other electrical components (data or power) at a minimal loading effect, i.e. with a high apparent input impedance to other component (data or power). A coupler differs from a filter in that a filter emphasizes the output characteristics rather than the input characteristics so that a filter may have a low apparent input impedance to other component (data or power). The power coupler of the power transceiver block 306 extracts power from or transmits the power to the tool bus through the Uplink ports, PortA and PortB.

The converter of the power transceiver block 306 is connected to the PortP and may receive the power from the PortP or from the tool bus through the local power coupler. The converter is configured to generate different power rails to output from the inward interface 302 of the interface module 300. The output power rails may have different voltages for various electronic needs. One of the rails is routed to another power transceiver block 307, to thereby exchange power with the Downlink port, PortL. The power transceiver block 307 comprises a power coupler which extracts power from or transmits power to the tool bus on the Downlink through PortL.

The power transceiver block 306 is shown as connected to the blocks UL_A 304 and UL_B 305, to enable an external power source to continue to power the tool bus even if the tool switch block TS 318 is open. In some implementations, the power transceiver block 306 may instead be connected to a data transceiver block 308 on the other side of the tool switch block TS 318. In this implementation, the tool switch block TS 318 is further able to disconnect faulty electronics of the power transceiver block 306 or the external power source from the tool bus.

The uplink signal from PortA and PortB is connected through the blocks UL_A 304 and UL_B 305 to a data transceiver block 308 and the power transceiver block 306. The data transceiver block 308 comprises a data coupler, a receiver R, and a transmitter T. The data coupler extracts the data signal from or transmits the data signal to the tool bus through the Uplink ports. The receiver R demodulates the uplink signal and outputs the demodulated signal to the main controller 310 for processing and communication to a connected electronics assembly. The transmitter T receives an input from the main controller 310 and modulates the input onto the uplink for communication on the tool bus.

Similarly, the downlink signal is connected through the block DL 303 to a data transceiver block 309 and the power transceiver block 307. The data transceiver block 309 comprises a data coupler, a receiver R, and a transmitter T. The data coupler extracts the data signal from or transmits the data signal to the tool bus through the Downlink port. The receiver R demodulates the downlink signal and outputs to the main controller 310 for processing and communication to a connected electronics assembly. The transmitter T receives the input from the main controller 310 and modulate the input onto the downlink for communication on the tool bus (i.e., at a different logical layer of the tool bus than the uplink ports).

Both the downlink and uplink may use the CPDT. The power voltage of both links may be the same or different. Preferably, the downlink has a lower power voltage. The data modulation scheme and communication speed of both links may be the same or different. Preferably, the downlink has a faster speed and has the same modulation scheme as the uplink. The tool bus can support different modulation schemes and communication standards. For example, modulation schemes and communication standards suitable for providing reliability in demanding downhole environments may include digital baseband modulation schemes such as Manchester coding, alternative mark inversion (AMI), Miller coding, etc. or simple passband modulation schemes such as frequency-shift keying (FSK), binary FSK (BFSK), amplitude-shift keying (ASK), on-off keying (OOK), etc.

The main controller 310 manages the operation of the module 300. The main controller 310 communicates with two data transceiver blocks 308 and 309, and also communicates with the PCB electronics via data communication connections on the inward interface 302. The main controller 310 may also perform communication transformations among the two data transceiver blocks 308 and 309 (e.g., when different communication speeds or modulation schemes are used at different logical layers of the tool bus), and the inward interface 302. In practice, the main controller 310 may be a FPGA, a MCU, a DSP, an ASIC, etc. or a combination thereof. The main controller 310 may also performs other control, monitoring, etc., functions. For example, as discussed above, the main controller 310 performs a diagnostic test on the electronics to identify any faults for controlling the tool switch blocks TS 315, 318.

The others functional block 311 is also connected to the main controller 310 and generally refers to common electronic functions used in the downhole electronics, which may include but not limited to temperature sensing, vibration monitoring, unique silicon ID, data storage and so forth. The others functional block 311 simplifies downhole tool electronics design by standardizing and incorporating these common electronic functions into the interface module 300. Therefore, space can be saved on the PCBA for implementing these common electronic functions in the interface module 300. Additionally, development time savings may be realized by not having to continually design and account for these common electronic functions on each PCBA of a tool. Because the interface module 300 may implement the common functions, substantial development work can be saved for each assembly so that the development period can be further shortened.

The inward interface 302 provides a multiple-contact connection to the assembly electronics where it is used. The connections of the inward interface 302 may be classified into three functional groups. A power group 314 of connections includes the various power rails which are generated by the converter of the power transceiver block 306. For modern electronics, the standard power rails include +15V, +12V, +5V, +3.3V, +1.8V, +1.5V, +1.2V, etc. All or a partial set of the standard power rails may be implemented. In the example shown in FIG. 3, the power group 314 includes four power rails. A first power rail DL_Pwr is preferably the same as the power to the power transceiver block 307, i.e., downlink power. A second and third power rails are +3.3V and +1.8V, which are most-widely used by modern electronics. A forth power rail is an accurate reference voltage which is also desired by most electronics. However, it should be understood that more or fewer power rails and any other combinations of rails and voltages may be used for the power group 314.

A communications group 313 is for data communications between the main controller 310 and PCBA electronics. Common communication methods used today are either parallel or serial. Parallel communications offer higher speed but require more contacts. Serial communications are preferred for simple connections, especially for SPI, SCI, UART, etc. In the example shown in FIG. 3, a serial communications interface with four data contacts according to the SPI standard are shown for the communications group 313. Namely, the communications group 313 includes a MOSI contact, a MISO contact, a SCK contact, and an SCS contact.

An others communication group 312 provides other data communication functions like a handshaking signal, firmware updates, tests, debugging and so on. In the example shown in FIG. 3, a Status contact is for communicating a status signal that indicates a state of the interface module 300, a Prg contact is for communicating a signal to select a mode of a local module (e.g., programming mode or operational mode), a Rqst contact is for communicating a signal to send requests outwardly to the PCBA electronics or the debugger, and a Rdy contact is for communicating a signal that indicates an operation result of the interface module 300. Different signals and functions may be included, as understood by an engineer of ordinary skills in the art. Although the inward interface 302 may use a varied number of connections from one embodiment to another one, it is preferred that the inward interface 302 is a standardized interface with a standardized number of contacts, functions, and contact layout for universality and reusability.

Minimum electronic footprints are desired for low cost and good reliability in downhole applications because the size of the protective cavities is minimized. Given the functionality described in the interface module 300, it may be practically difficult to achieve a reasonable size with conventional electronic packaging technology. Conventional packaging technology typically uses packaged electronic components with low package efficiency. Advances in electronic packaging techniques have been made, such as chip-scale package, flip-chip, 3-D packaging, die stack-up, etc. In the advanced electronic packaging technology, miniaturized electronics like package-less raw dies, highly-integrated parts may be used. Today, it is practical to implement the interface module 300 with advanced packaging techniques in a footprint comparable to one midsize micro D connector, e.g., 1"×2". However, advanced packaged technology typically has higher development costs which lend them to standardized designs. A standardized inward interface 302 will meet this expectation. Meanwhile, it is preferred to implement the module 300 as one standard component in the practice so that the module can be easily installed into an electronic assembly.

Example Toolstring Layout with Multi-Layer Tool Bus

Figure 4:
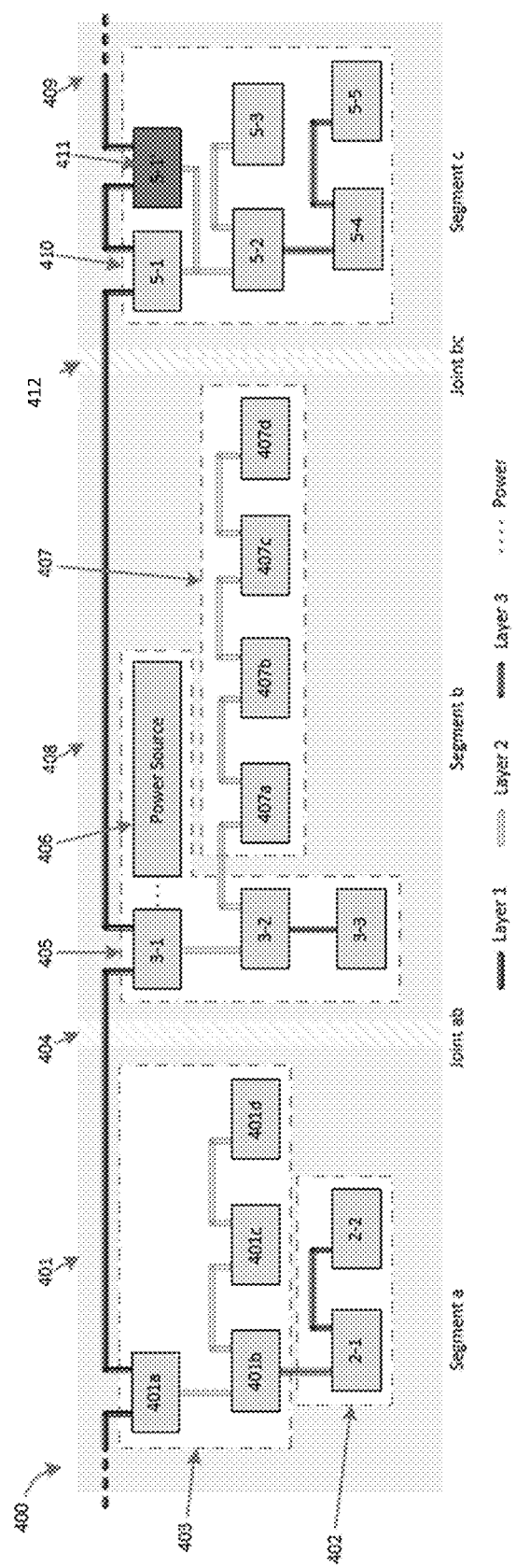
FIG. 4 is a schematic diagram of a partial toolstring with a layered tool bus architecture according to various implementations of the disclosure.

FIG. 4 is a schematic diagram of a partial toolstring 400 with a layered tool bus architecture according to various implementations of the disclosure. As shown, the partial toolstring 400 comprises of five tools spread across multiple segments, where each tool has multiple PCBAs that use the interface module 300 to directly connect to the tool bus. For simplicity, only a few tools on some segments of a toolstring are shown. Additionally, only the segments, tools, tool electronic assemblies (e.g., PCBAs), and the tool bus are shown, though other electronics, connections, tools, and components may be present.

The partial toolstring 400 of FIG. 4 shows a first segment 401 that includes a first tool 403 and a second tool 402. The first tool 403 includes electronic assemblies 401a-401d. The second tool 402 includes electronic assemblies 2-1 and 2-2. Each electronic assembly of the first and second tools 403, 402 include an interface module 300. Through the outward interface 301 of the interface module 300, each of the electronic assemblies of the first tool 403 and the second tool 402 are directly connected to the tool bus. For example, the electronic assembly 401a of the first tool 403 is connected to a first layer of the tool bus through the uplink ports PortA and PortB of the interface module 300 on the electronic assembly 401a. Likewise, the electronic assembly 401a is connected to a second layer of the tool bus through the downlink port PortL of the interface module 300. As shown, the electronic assembly 401a is connected to the electronic assembly 401b on the second layer of the tool bus. Each of electronic assemblies 401b-401d connect to the tool bus on the second layer through their uplink ports PortA and PortB of their respective interface modules 300. Electronic assembly 401b is further connected to a third layer of the tool bus through the downlink port PortL of the interface module 300. The electronic assembly 401b is connected to the electronic assembly 2-1 of the second tool 402 on the third layer of the tool bus. Each of electronic assemblies 2-1 and 2-2 are connected to the tool bus on the third layer through their uplink ports PortA and PortB of their respective interface modules 300.

The partial toolstring 400 of FIG. 4 shows a second segment 408 that includes a third tool 405 and a fourth tool 407. The first segment 401 and the second segment 408 are connected to each other by a joint 404. The third tool 405 includes electronic assemblies 3-1-3-3. The fourth tool 407 includes electronic assemblies 407a-407d. Each electronic assembly of the third and fourth tools 405, 407 are connected to the tool bus through an outward interface 301 of an interface module 300. For example, the electronic assembly 3-1 of the third tool 405 is connected to the first layer of the tool bus through the uplink ports PortA and PortB of the interface module 300 on the electronic assembly 3-1. The first layer of the tool bus connects the electronic assembly 401a in the first segment 401 and the electronic assembly 3-1 in the second segment 408 through the joint 404. In some implementations, the first layer of the tool bus may pass across joint segments through a single electrical contact.

The electronic assembly 3-1 is connected to a second layer of the tool bus through the downlink port PortL of the interface module 300. Additionally, the electronic assembly 3-1 is connected to a power source 406 through PortP of the interface module 300. The electronic assembly 3-1 is connected to the electronic assembly 3-2 on the second layer of the tool bus. The electronic assembly 3-2 connects to the tool bus on the second layer through its uplink ports PortA and PortB on the interface module 300. Electronic assembly 3-2 is further connected to a third layer of the tool bus through the downlink port PortL of the interface module 300. The electronic assembly 3-2 is connected to the electronic assembly 3-3 on the third layer of the tool bus. The electronic assembly 3-3 is connected to the tool bus on the third layer through one of its uplink ports PortA or PortB of the interface modules 300.

At the second layer of the tool bus, the electronic assembly 3-2 of the third tool 403 is connected to the electronic assemblies 407a-407d of the fourth tool 407. Each of electronic assemblies 407a-407d connect to the tool bus on the second layer through their uplink ports PortA and PortB of their respective interface modules 300.

The partial toolstring 400 of FIG. 4 shows a third segment 409 that includes a fifth tool 410. The second segment 408 and the third segment 409 are connected to each other by a joint 412. The fifth tool 410 includes electronic assemblies 5-1-5-5. Each electronic assembly of the fifth tool 410 are connected to the tool bus through an outward interface 301 of an interface module 300. For example, the electronic assembly 5-1 of the fifth tool 410 is connected to the first layer of the tool bus through the uplink ports PortA and PortB of the interface module 300 on the electronic assembly 5-1. The first layer of the tool bus connects the electronic assembly 3-1 in the second segment 408 and the electronic assembly 5-1 in the third segment 409 through the joint 412. In some implementations, the first layer of the tool bus may pass across joint segments through a single electrical contact.

The electronic assembly 5-1 is connected to a second layer of the tool bus through the downlink port PortL of the interface module 300. The electronic assembly 5-1 is connected to the electronic assembly 5-2 on the second layer of the tool bus. The electronic assemblies 5-2 and 5-3 connect to the tool bus on the second layer through their uplink ports PortA and PortB on their respective interface modules 300. Electronic assembly 5-2 is further connected to a third layer of the tool bus through the downlink port PortL of the interface module 300. The electronic assembly 5-2 is connected to the electronic assembly 5-4 on the third layer of the tool bus. The electronic assemblies 5-4 and 5-5 are connected to the tool bus on the third layer through their uplink ports PortA and PortB on their respective interface modules 300.

The unified simple connection to the tool bus through the interface module 300 also enables the redundancy of an electronics assembly so that a higher system reliability can be achieved. In a conventional tool design, complex interconnections among assemblies makes it impractical to use a redundant assembly which can be in-situ swapped with a problematic counterpart. Given the simple bus connection of the interface module 300, a redundant assembly can be used.

For example, the assembly 5-1 of the fifth tool 410 may have a higher failure rate or a shorter lifetime than desired in a downhole environment. A redundant assembly 5-1' is used in parallel to the assembly 5-1. That is, the redundant electronic assembly 5-1' of the fifth tool 410 is connected to the first layer of the tool bus through the uplink ports PortA and PortB of the interface module 300 on the electronic assembly 5-1'. Likewise, the redundant electronic assembly 5-1' is connected to assembly 5-2 on the second layer of the tool bus through the downlink port PortL of the interface module 300. In normal operations, the assembly 5-1' is disconnected from the tool bus (e.g., the tool switch blocks TS 315, 318 are opened). When a failure occurs to the assembly 5-1, the assembly 5-1 is first disconnected from the tool bus (e.g., the tool switch blocks TS 315, 318 are opened) and the assembly 5-1' is then connected to the tool bus (e.g., the tool switch blocks TS 315, 318 are closed) to continue the tool operation. Therefore, the tool reliability can be improved although the reliability of the assemblies remains unchanged.

As shown in FIG. 4, the tool bus architecture may include tools that have a flat-hierarchy and tools that have a vertical-hierarchy. The flat-hierarchy and the vertical-hierarchy have different advantages. The flat-hierarchy gives PCBAs equal visibility and the same communication latency among the PCBAs. Thus, the flat-hierarchy is preferred when all PCBAs have similar communication needs. As each bus layer has some maximum number of nodes that are supported by the bus, the flat-hierarchy generally supports fewer tools. In the contrast, the vertical-hierarchy gives the top layer shorter communication latency and better visibility than the bottom layer. The vertical-hierarchy is preferred when a particular PCBA of a tool has a high-speed communication need. Moreover, vertical-hierarchy better supports bus section multiplexing and more tools. A mixed hierarchy, such as shown in FIG. 4, may also be created for specific application needs.

Bus section multiplexing is disclosed by the same applicant in U.S. patent application Ser. No. 15/902,328, entitled "Intelligent Tool Bus Network for a Bottom Hole Assembly," filed on Feb. 22, 2018, hereby incorporated by reference in its entirety.

Example Tool with Flat-Hierarchy

Figure 5:
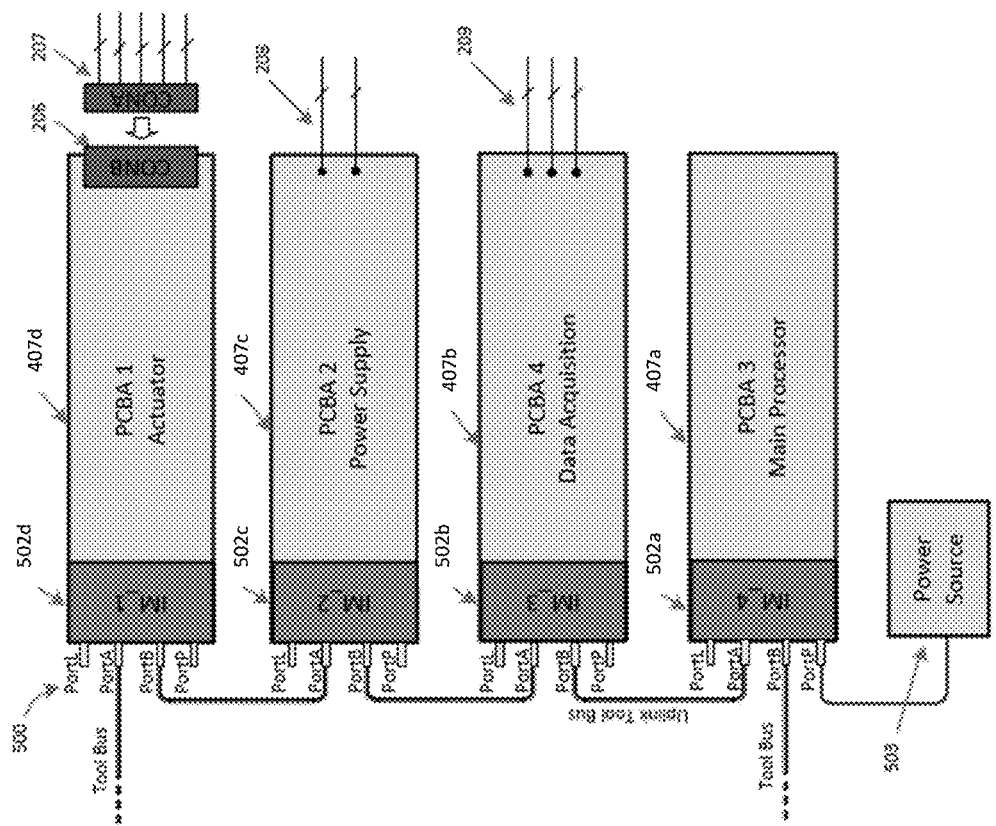
FIG. 5 is a schematic diagram of a flat-hierarchy tool design using the unified interface module according to various implementations of the disclosure.

FIG. 5 is a schematic diagram of a flat-hierarchy tool 500 using the unified interface module 300 according to various implementations of the disclosure.

As an example, the tool 500 follows the structure of the fourth tool 407 described above. The tool 500 comprises of 4 PCBAs 407a-407d. Each of the PCBAs 407a-407d integrates a unified interface module 300. Each interface module 300 is internally connected to the corresponding PCBA electronics through the standardized inward interface 302 (not shown in the Figure). Each of the interface modules 502a-502d are joined in series by transmission lines via the two uplink ports, PortA and PortB, and thereby to create a partial tool bus (e.g., uplink bus). For example, PortB of the interface module 502a on PCBA 407a is connected to a layer of the tool bus (e.g., the second layer of the tool bus in FIG. 4). Likewise, PortA of the interface module 502a on PCBA 407a is connected to a first end of a first transmission line. The first transmission line is connected at a second end to the PortB of the interface module 502b of PCBA 407b. PortA of the interface module 502b on PCBA 407b is connected to first end of a second transmission line. The second transmission line is connected at a second end to the PortB of the interface module 502c of PCBA 407c. PortA of the interface module 502c on PCBA 407c is connected to first end of a third transmission line. The third transmission line is connected at a second end to the PortB of the interface module 502d of PCBA 407d. PortA of the interface module 502d on PCBA 407d may be further connected to another transmission line or may be left un-connected. As shown in FIG. 4, PortA of PCBA 407d is un-connected.

Additionally, PCBA 407a is also connected to an external power source 503 which may be a downhole turbine, a battery or a combination thereof. The power source 503 is used to power the tool bus via the interface module 502d. As the interface module provide a standardized outward interface, the power source 503 may be connected to any of the other PCBAs 407b-407d or simply omitted when the tool 500 is to receive power from the tool bus.

Example Tool With a Vertical-Hierarchy

Figure 6:
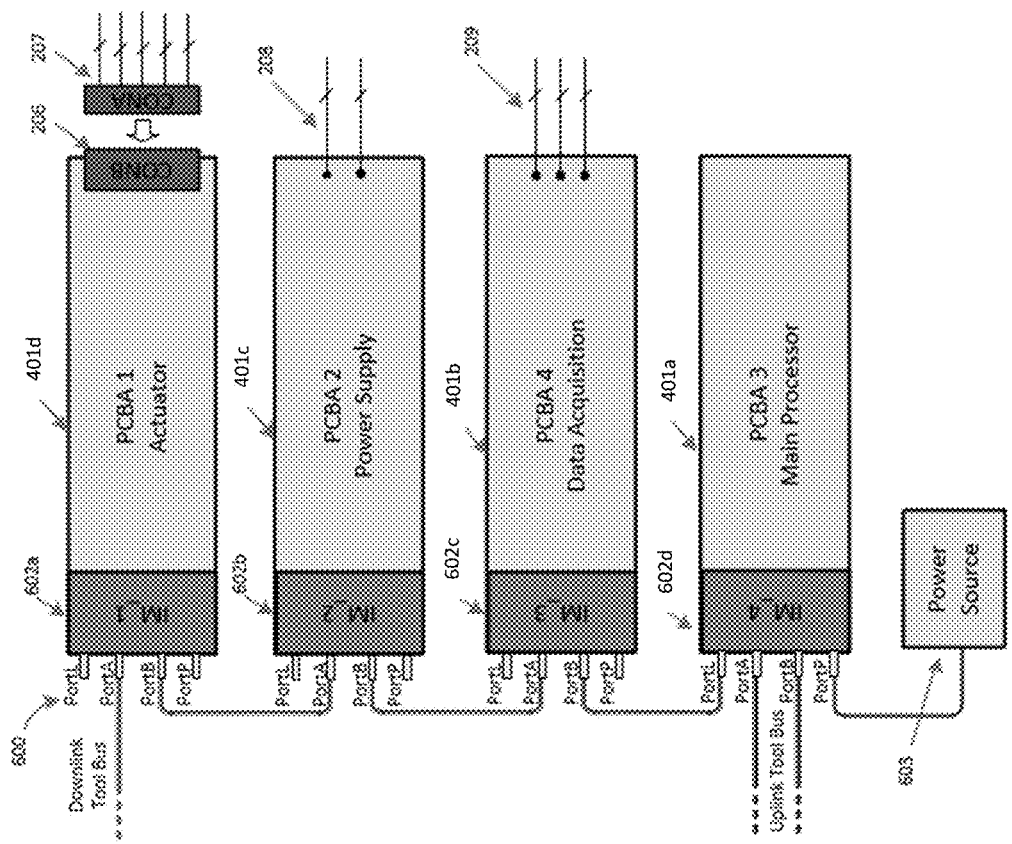
FIG. 6 is a schematic diagram of a vertical-hierarchy tool design using the unified interface module according to various implementations of the disclosure.

FIG. 6 is a schematic diagram of a vertical-hierarchy tool 600 using the unified interface module 300 according to various implementations of the disclosure.

As an example, the tool 600 follows the structure of the first tool 403 described above. The tool 600 comprises of 4 PCBAs 401a-401d. Each of the PCBAs 401a-401d integrates a unified interface module 300. Each interface module 300 is internally connected to the corresponding PCBA electronics through the standardized inward interface 302 (not shown in the Figure). As shown in FIG. 6, the PCBA 401a is connected to the first layer of the tool bus through the uplink ports, PortA and PortB to create part of the first layer of the tool bus. PCBAs 401b-401d are connected to the second layer of the tool bus (e.g., uplink bus) through their respective uplink ports, PortA and PortB to create a partial toolstring bus (e.g., downlink bus). The uplink PortB of PCBA 401b is connected to the downlink PortL of the PCBA 401a.

For example, PortA and PortB of the interface module 602d on PCBA 401a is connected to a layer of the tool bus (e.g., the first layer of the tool bus in FIG. 4). Likewise, PortL of the interface module 602d on PCBA 401a is connected to a first end of a first transmission line. The first transmission line is connected at a second end to the PortB of the interface module 602c of PCBA 401b. PortA of the interface module 602c on PCBA 401b is connected to first end of a second transmission line. The second transmission line is connected at a second end to the PortB of the interface module 602b of PCBA 401c. PortA of the interface module 602b on PCBA 401c is connected to first end of a third transmission line. The third transmission line is connected at a second end to the PortB of the interface module 602a of PCBA 401d. PortA of the interface module 602a on PCBA 401d may be further connected to another transmission line or may be left un-connected. As shown in FIG. 4, PortA of PCBA 401d is un-connected.

It should be understood that the terms of "downlink bus" and "uplink bus" are meaningful only within one tool and are used to descriptively specify different bus layers. In fact, a tool may have multiple layers if each PCBA joins its one uplink port (PortA or PortB) to the downlink port PortL of the next-layer PCBA. In the case, other terms like "mid link 1", "mid link 2" may be used to differentiate each bus layer. Although many layers may be created, it is preferred no more than 3 layers as each layer may introduce extra latency and slow down the whole bus. Each bus layer of a tool can be used to join to other tools regardless what hierarchy are used. For example, the tool 500 may join to the downlink bus or uplink bus of the tool 600. Therefrom, one downhole tool bus with a flexible hierarchy can be created.

Streamlined Tool Development

Successful electronics development requires testing the electronics in the same loading (i.e. Outputs) and stimulating (i.e., Inputs) conditions where the electronics are to be used. In a downhole tool, electronics must usually be partitioned into various assemblies in order to fit into dispersed cavities in the long thin tool body. In a conventional tool design, the harnesses used to interconnect the assemblies are typically made up of tens of stranded wires, by which a large number of connections are built up. As the result, this creates complex dependency between the various electronics assemblies. Typically, each assembly must be tested with other dependent assemblies. As the result, in addition to assembly level testing, a tool level test with all assemblies is required. Moreover, when a new tool is added to a toolstring, the existing tools in the toolstring may potentially be impaired. Therefore, a newly-development tool must also be tested in the toolstring to verify the system compatibility and integrity.

Through the outward interface 301 of the module 300, as each electronic assembly of a tool is developed, it can be directly connected to the toolstring without waiting for completion of other electronic assemblies of the tool so that an assembly can be independently tested. Although an assembly may be still dependent on others for control, data, synchronization and the like, the dependency can be easily simulated while the assembly is connected to the toolstring. Therefore, a real in-toolstring development is created. Moreover, the same development setup can be universally used for all assemblies to achieve all the test needs as the conventional assembly-, tool- and toolstring-level development. Therefore, a streamline development process is achieved.

Figure 7:
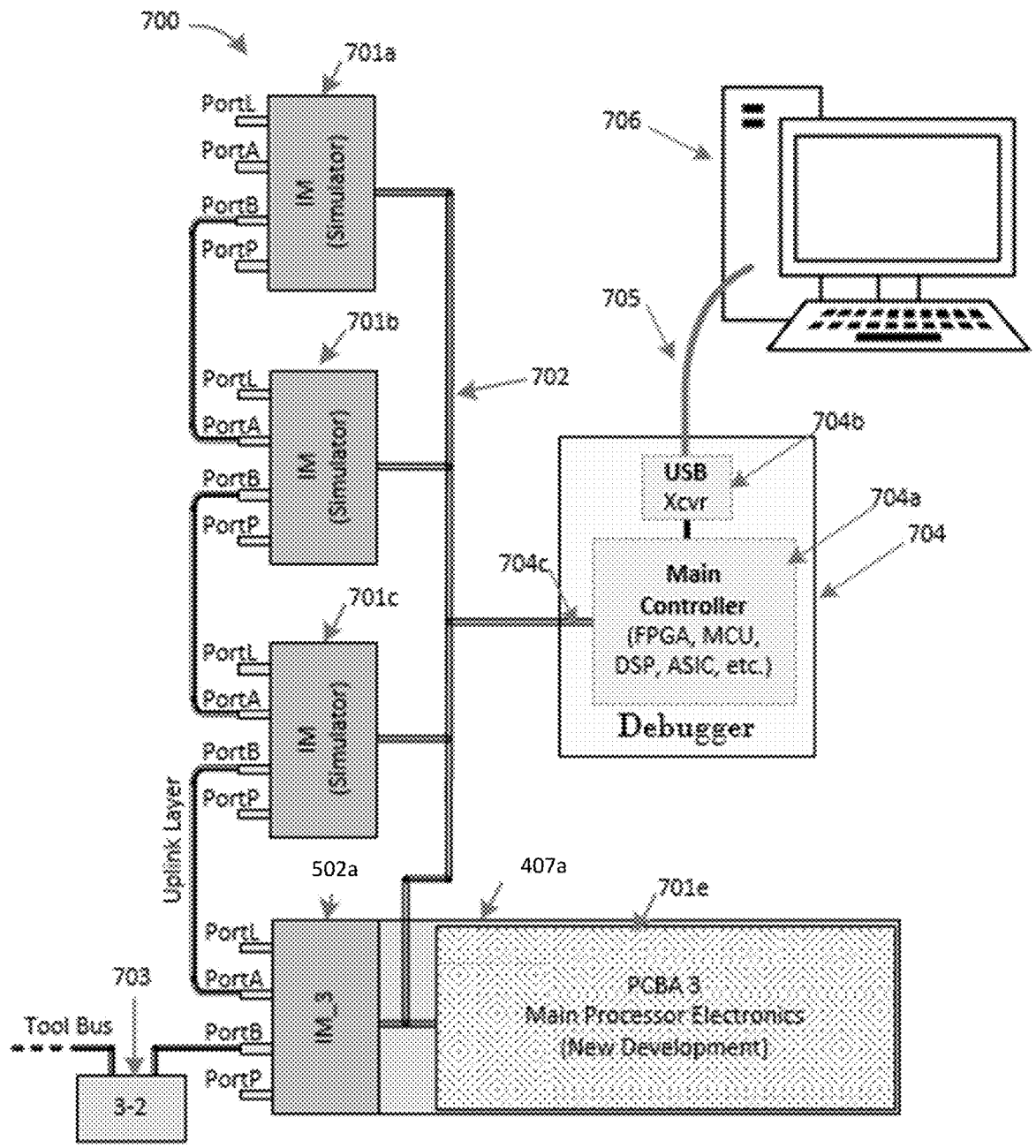
FIG. 7 is a schematic diagram of a testing environment for streamlined development and debugging an electronic assembly using the unified interface module according to various implementations of the disclosure.

FIG. 7 is a schematic diagram of a testing environment 700 for streamlined development and debugging an electronic assembly using the unified interface module 300 according to various implementations of the disclosure. To illustrate the features of the testing environment 700, in the example discussed below, it is assumed that the fourth tool 407 is a new tool that is being developed for the toolstring 400 in the FIG. 4. It is further assumed that the PCBA 407a has been developed first and is ready to be tested. It is further assumed that development of the other PCBAs 407b-407d of the fourth tool 407 has not been completed, but one or more dependencies (e.g., control, data, synchronization, etc.) exist between the PCBA 407a and one or more of the PCBAs 407b-407d.

In the FIG. 7, the ready-to-test PCBA 407a can be first connected to a tool bus of the simulator toolstring 700 through the assembly 3-2 of an existing tool 703 on the simulator toolstring 700. The simulator toolstring 700 may include all of the electronic assemblies as well as the connected tools and components of a toolstring in which the new tool will be deployed. The PCBA 407a includes the interface module 502a, with the outward interface 301 for connecting to the tool bus, and the inward interface 302 for connecting to electronics 701e (e.g., components and/or modules) that are being tested for the PCBA 407a.

The inward interface 302 of the interface module 502a is also connected to a debugger 704 through a wire harness 704c. The wire harness 704c may include a connector for connecting to the inward interface 302. The debugger 704 is used to control and manage the testing process. The debugger 704 comprises a main controller block 704a to perform the required debugging or other testing functions, such as measurement, actuation, logging, etc. Typically, the testing process is interactively controlled and visually displayed with all measurements and loggings. Accordingly, the debugger 704 is further connected through a USB transceiver 704b to a test PC 706 via a USB cable 705. In the test PC 604, a user-friendly test application may run to integrally execute the debugging, testing, diagnosing, logging and so on. Although the USB interface is preferred for its popularity in modern PCs, other interfaces may also be used like RS485, RS232, thunderbolt, etc.

When the PCBA 407a has a dependency on other PCBAs 407b-407d which are still under the development, the dependency can be simulated using one or more simulator interface modules 701a-701c. The simulator interface modules 701a-701c are structurally identical to the unified interface module 300, but are not connected to a PCBA, although other functions may be potentially added. The outward interface 301 of each of the simulator modules 701a-701c is connected to the tool bus of the simulator toolstring 700 via transmission lines. However, the inward interface 302 of the simulator modules 701a-701c is connected to the debugger 704 via the wire harness 704c. While illustrated as a single wire harness with connections to the inward interface 302 of each of the simulator modules 701a-701c and the PCBA 407a, in some implementations, a separate wire harness may be used for each. In some implementations, there may be a separate wire harness for all simulator modules to be used in a given test configuration and a separate wire harness for all PCBAs to be tested in a given test configuration.

The simulator modules 701a-701c can be used to simulate the dependencies between the PCBA 407a and the other electronic assemblies of the tool 407 still under development. The debugger 704 is configured to stimulate the inward interface 302 of each of the simulator modules 701a-701c and cause the simulator modules 701a-701c to interact with the tool bus of the simulator toolstring 700 in a manner substantially the same as the PCBAs 407b-407d once developed.

The testing setup in FIG. 7 can be dynamically reconfigured. As additional ones of the PCBAs 407b-407d are developed and are ready for testing, the corresponding simulator modules 701a-701c can be simply replaced with the real PCBAs. In the manner, any combination of PCBAs 407a-407d of the new tool 407 can be tested in the real toolstring. It should be understood that the testing environment described above provides a universal testing environment, but it may be simplified in specific applications. For instance, one assembly may have little dependency on other assemblies, and then the simulator modules 701a-701c may not be used. Additionally, the simulator modules 701a-701c are shown as standalone components in FIG. 7, but may also be integrated into the debugger 704 as a signal device for convenience.

Figure 8:
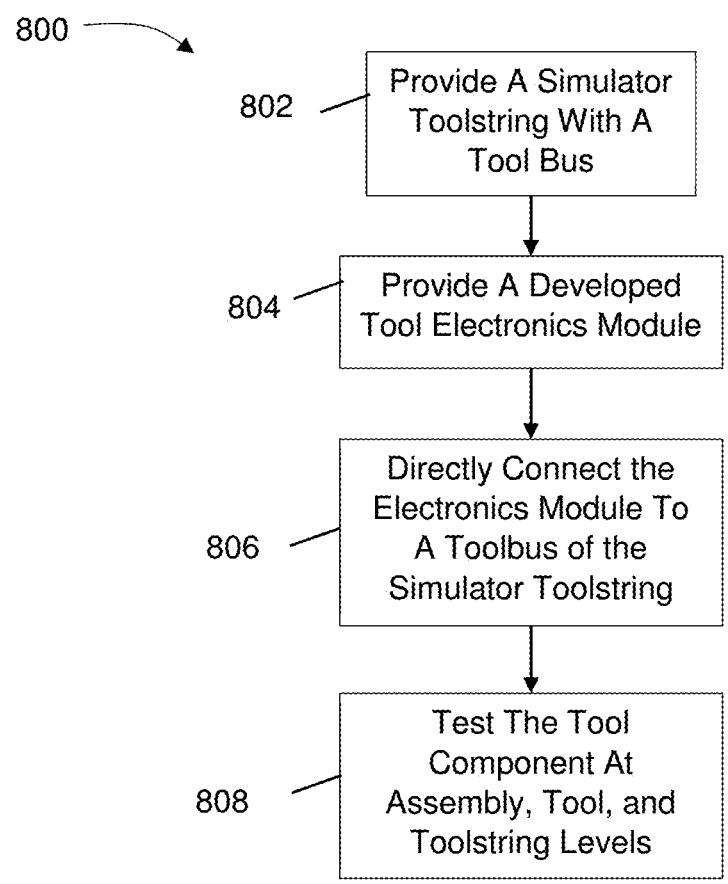
FIG. 8 is a flow diagram of a testing process for testing an electronic assembly using the unified interface module according to various implementations of the disclosure.

FIG. 8 is a flow diagram of a testing process 800 for testing an electronic assembly using the unified interface module 300 according to various implementations of the disclosure. At 802, a simulator toolstring with a tool bus is provided. At 804, an electronics assembly of a new downhole tool is provided prior to completion of development of dependent electronic assemblies of the tool. The electronics assembly of the new downhole tool includes the unified interface module 300. At 806, the electronics assembly of the new downhole tool is directly connected to the tool bus of the simulator toolstring via a transmission line connected to one of the ports on outward interface 301 of the unified interface module 300. At 808, the electronics assembly of the new downhole tool is tested at each of the assembly, tool, and toolstring levels, for example as described above in conjunction with FIG. 7.

Figure 9:
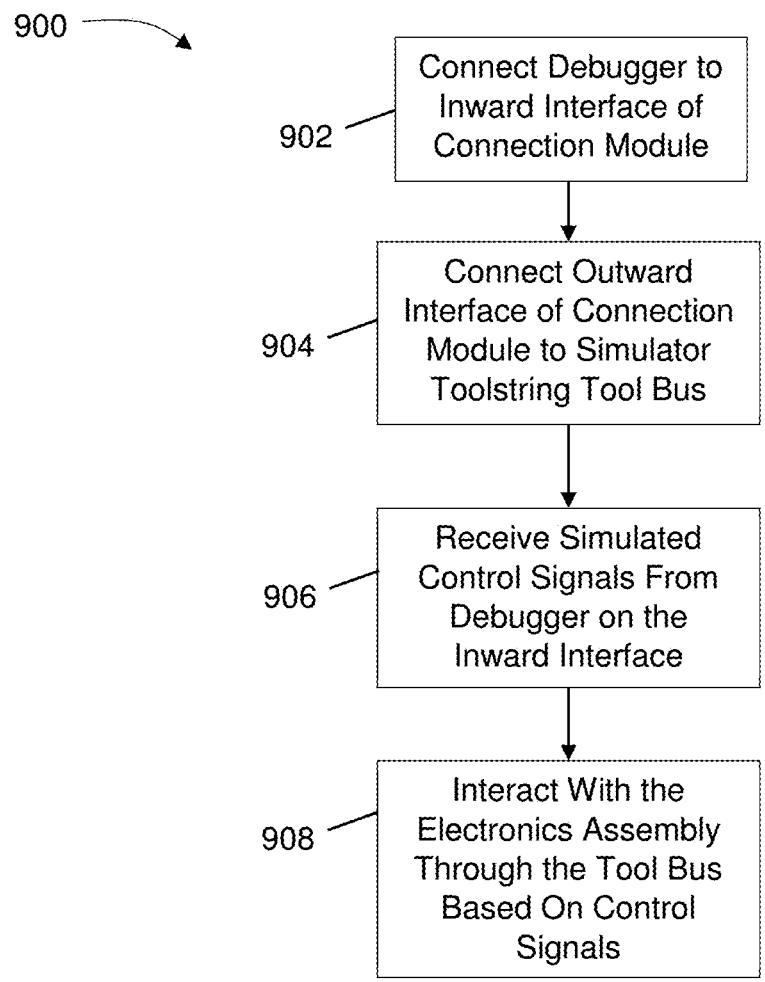
FIG. 9 is a flow diagram of a simulation process for simulating an electronic assembly using the unified interface module according to various implementations of the disclosure.

FIG. 9 is a flow diagram of a simulation process 900 for simulating an electronic assembly using the unified interface module 300 according to various implementations of the disclosure. At 902, a debugger is connected to an inward interface 302 of a simulator interface module 701. At 904, an outward interface 301 of simulator interface module 701 is connected to a tool bus including a second electronics assembly of a new downhole tool with a dependency on the electronic assembly. At 906, the inward interface 302 of the simulator interface module 701 receives simulated control signals from the debugger to simulate the dependency on the electronic assembly. At 908, the simulator interface module 701 interacts with the second electronics assembly through the tool bus in accordance with the dependency on the electronic assembly.

As described above, the interface module 300 enables parallel development and testing of each PCBA of a new tool. In addition to the interface module 300, a relevant development kit such as firmware driver(s), standardized protocol(s), user APIs and the like may be provided. Component and module level development of tool electronics may be performed similar to traditional development practices. Thereafter, only a single streamlined assembly (e.g., PCBA), tool, and toolstring test is needed since the electronic assemblies are directly connected to the tool bus of the simulator toolstring and tested in a way similar to how they are intended to be used in the field.

In comparison to the conventional development and testing process, the streamlined process presents tremendous advantages in many aspects. First, real parallel development is created. Each PCBA can be developed independently so that resources can be more efficiently used. Second, there is a much shorter development period as harness customization and test box design are not required. Third, it saves the cost of test box creation and other resources. Forth, it minimizes unexpected expensive development iterations in order to correct any design flaws. Fifth, it creates a more predictable tool development and lower the requirements on project budgeting and scheduling.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. An interface module, comprising:
a first interface configured to transmit and receive power and data over a tool bus to which multiple printed circuits boards (PCBs) are coupled, said first interface comprising a first port for connecting to a first conductor section of the tool bus and a second port for connecting a second conductor section of the tool bus, wherein the first and second conductor sections of the tool bus comprise transmission lines at a first logical layer of the tool bus;
a first data transceiver in communication with the first and second ports and configured to receive a data signal from or transmit a data signal to the tool bus through the first and second ports;
a first power transceiver in communication with the first and second ports and configured to receive power from or transmit power to the tool bus through the first and second ports, and to generate one or more voltages for different power rails;
a second interface comprising,
a group of power contacts configured to connect corresponding power contacts of a PCB with multiple different power rails generated by the first power transceiver; and
a group of data contacts configured to connect corresponding data contacts of the PCB with the first data transceiver;
a main controller communicatively coupled with the first data transceiver and the first power transceiver and configured to control the first power transceiver and the first data transceiver, and to communicate with the tool bus via the first interface;
a third port for connecting to a third conductor section of the tool bus, wherein the third conductor section is at a second hierarchical layer of the tool bus;
a second data transceiver in communication with the third port and configured to receive a data signal from or transmit a data signal to the second hierarchical layer of the tool bus through the third port; and
a second power transceiver connected to the third port and the first power transceiver and configured to receive power from or transmit power to the second hierarchical layer of the tool bus through the third port.

2. The interface module of claim 1, wherein the main controller is further configured to process data communications and perform communication transformations between the first data transceiver and the group of data contacts.

3. The interface module of claim 1, wherein the main controller is further configured to process data communications and perform communication transformations between the first data transceiver and the second data transceiver, and the group of data contacts.

4. The interface module of claim 1, wherein each of the first and second ports, and the third port comprises a pair of contacts for connection to a transmission line and communication of power and data over the tool bus.

5. The interface module of claim 1, further comprising:
a power port coupled to the first power transceiver and configured to receive power from an external power source.

6. The interface module of claim 1, wherein the first conductor section is a first transmission line and the second conductor section is a second transmission line.

7. A downhole tool, comprising:
a first electronics assembly for performing a first function of the downhole tool, wherein the first electronics assembly comprises a first interface module;
a second electronics assembly for performing a second function of the downhole tool, wherein the second electronics assembly comprises a second interface module, wherein the first and second interface modules each include,
a first interface configured to transmit and receive power and data over a tool bus, wherein the first interface comprises a first port and a second port for connecting to different conductor sections of the same hierarchical layer of the tool bus, wherein the first and second interfaces each further include a third port for connecting to a different conductor section of the tool bus at a different hierarchical layer than the first and second tool bus ports;
a first data transceiver in communication with the first and second ports and configured to receive a data signal from or transmit a data signal to the tool bus through the first and second ports;
a first power transceiver in communication with the first and second ports and configured to receive power from or transmit power to the tool bus through the first and second ports, and to generate one or more voltages for different power rails;
a second interface comprising,
a group of power contacts configured to connect corresponding power contacts of a printed circuit board (PCB) with multiple different power rails generated by the first power transceiver; and
a group of data contacts configured to connect corresponding data contacts of the PCB with the first data transceiver;
a main controller communicatively coupled with the first data transceiver and the first power transceiver and configured to control the first power transceiver and the first data transceiver, and to communicate with the tool bus via the first interface;
a third port for connecting to a third conductor section of the tool bus, wherein the third conductor section is at a second hierarchical layer of the tool bus;
a second data transceiver in communication with the third port and configured to receive a data signal from or transmit a data signal to the second hierarchical layer of the tool bus through the third port; and
a second power transceiver connected to the third port and the first power transceiver and configured to receive power from or transmit power to the second hierarchical layer of the tool bus through the third port.

8. The downhole tool of claim 7, further comprising:
a first transmission line connected between the first port of the first unified interface module and the second port of the second unified interface module to provide a first conductor section of the tool bus.

9. The downhole tool of claim 8, further comprising:
a third electronics assembly for performing a third function of the tool, wherein the third electronics assembly comprises a third unified interface module with the first interface; and
a second transmission line connected between the first port of the second unified interface module and the second port of the third unified interface module to provide a second conductor section of the tool bus.

10. The downhole tool of claim 9, wherein the first conductor section and the second conductor section of the tool bus are at a first hierarchical layer of the tool bus.

11. The downhole tool of claim 9, further comprising:
a fourth electronics assembly for performing a fourth function of the tool, wherein the fourth electronics assembly comprises a fourth unified interface module with the first interface; and
a third transmission line connected between the third port of the fourth unified interface module and the second port of the first unified interface module to provide a third conductor section of the tool bus.

12. The downhole tool of claim 11, wherein the third conductor section of the tool bus is at a second hierarchical layer of the tool bus.

13. The downhole tool of claim 11, wherein the third conductor section is a transmission line.

* * * * *